Aug. 7, 1928.

W. F. HELWIG 1,679,902

TIRE CHAIN LOCK

Filed Jan. 29, 1927

Inventor
William F. Helwig
By
Attorneys

Patented Aug. 7, 1928.

1,679,902

UNITED STATES PATENT OFFICE.

WILLIAM F. HELWIG, OF MILTON, WISCONSIN.

TIRE-CHAIN LOCK.

Application filed January 29, 1927. Serial No. 164,607.

This invention relates to tire chain locks.

In tire chain locks as heretofore constructed, difficulty has been experienced in the practical use or operation of these devices due primarily to projections of certain parts of the lock which pick up mud and trash, and are otherwise unserviceable.

This invention is designed to overcome the defects noted above and objects of such invention are, therefore, to provide a tire chain lock which is devoid of projecting parts of any material dimensions, but which instead consists of a substantially flat elongated member with very little projecting portions and which is so constructed that it is relatively small in its overall dimensions.

Further objects are to provide a tire chain lock which will securely lock the tire chains together, which can not be inadvertently opened, but which may be opened in a prearranged manner by means of a manipulating key or pin, and which provides a socket on both sides of the locking plunger so that such locking plunger is securely held on both sides of the attached link.

An embodiment of the invention is shown in the accompanying drawings in which.

Figure 1:
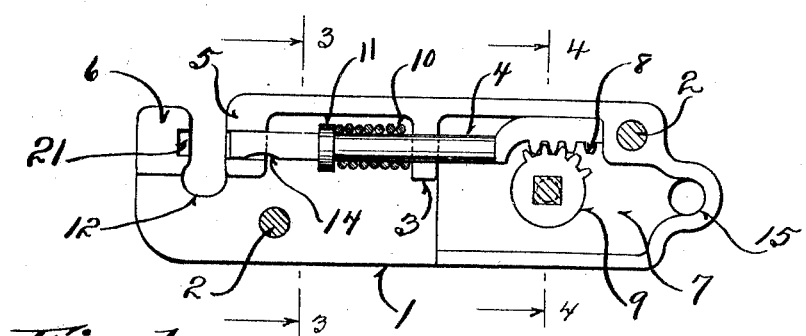
Figure 1 is a view taken through the tire chain lock longitudinally thereof.

Referring to the drawings, it will be seen that the device is formed of two main portions 1 which are held together by means of rivets or suitable members 2 so that when the device is assembled the parts are suitably enclosed and housed. These members are relatively small plate-like structures having recessed parts and having a central projecting lug 3 for guiding the locking plunger 4, and a pair of spaced lugs 5 and 6 for the further guiding of the locking plunger. Further, the members 1 are provided with compartments or chambers 7 which together form a main chamber for the reception of the rack 8 and the segmental gear or pinion 9. The rack 8 is integral with the pin 4 and serves to retract the pin against the action of the spring 10, such spring bearing against the lug 3 and against a collar 11 carried by the plunger 4.

Figure 2:
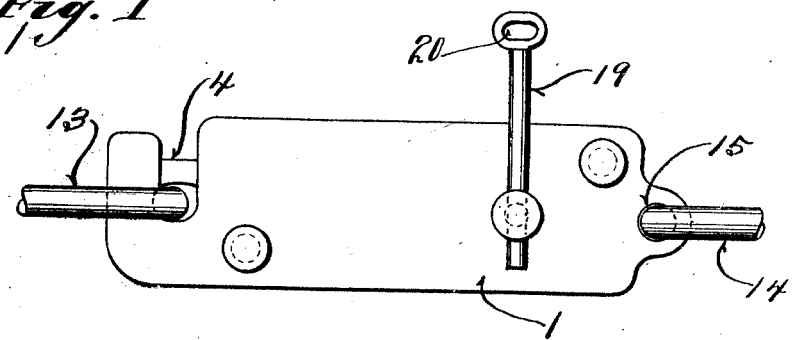
Figure 2 is a side elevation of the device.

It is to be noted that the members are recessed as indicated at 12, for the accommodation of the detachable link 13 and further it is to be noted that the locking plunger is also recessed as indicated at 14, to complete the eyelet effect of the recess 12, as shown in Figure 2, and to provide adequate space for the free rocking of the detachable link 13. The other end of the chain has its terminal link 14 received in the aperture 15.

Figure 4:
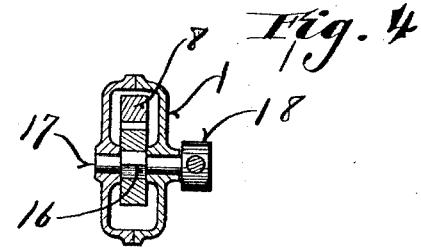
Figure 4 is a sectional view on the line 4—4 of Figure 1.

The gear 9 is provided with a square opening centrally thereof which receives the squared portion 16 of the rock shaft 17. The rock shaft is carried by the members 1, as shown most clearly in Figure 4, and is provided with an apertured head 18 on the outer side of the member. This apertured head is adapted to receive a detachable manipulating pin 19 so that the shaft 17 may be freely rocked by pulling on the pin 19 to thus retract the locking plunger 4 against the action of the spring and permit detachment or insertion of the free link 13.

Figure 3:
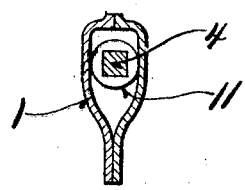
Figure 3 is a sectional view on the line 3—3 of Figure 1.

After the device is locked in place, the pin 19 is removed. The pin 19 is preferably eyeleted, as indicated at 20, so that it may be readily carried in a suitable manner by the operator. It is preferable to form the outer projecting end of the locking plunger 4 of square cross section, as shown in Figure 3, and to similarly form the sockets in the webs or lugs 5 and 6 so that the pin is held against turning. Further, by providing a socket 21 in the ear or lug 6, it will be seen that the locking plunger is supported on opposite sides of the recess 12 and, consequently, the utmost security of attachment for the end link 13 is attained.

Figure 5:
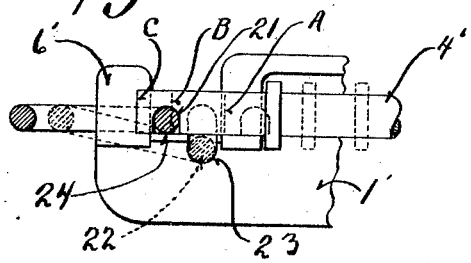
Figure 5 is a fragmentary view of a modified form of the invention.

Referring to the form shown in Figure 5, it will be seen that the same inventive idea is employed, but that the bar 4' carried by the body portion 1' is provided with a recess 21 which is adapted to completely receive the link 22. Further, it is to be noted that the body portion is provided with a recess 23 which temporarily receives the link and that thereafter the bar is slid across, the link raised into the aperture 21 in the bearings, and the bar slid into its extreme position socketing within the portion 6'. It is to be noted, however, that each half of the body portion is provided with an inwardly turned lip or rest 24 so that this rest forms a support for the link 22 when such link is in its final position, as shown in full lines in Figure 5.

In using this form of the invention, the link is first slipped into the notch 23 when the end of the bar occupies the position marked "A". Thereafter, the bar is slid forwardly until its end occupies the position marked "B". The link is now raised into the notch 21 in the bar and the bar is slid forwardly until its end occupies the position marked "C" at which time the link is wholly within the notch 21 formed in the bar.

It will be seen that the device is of very substantial construction, is small, and does not occupy much space on the side of the tire, and is free from any projecting portions of a material size which are likely to gather mud and otherwise interfere with the efficient operation of the device.

Although the invention has been described in considerable detail such description is intended as illustrative rather than limiting as the invention may be variously embodied and as the scope of such invention is to be determined as claimed.

I claim:

1. A tire chain lock comprising a relatively flat elongated member formed of two small plate-like portions and having together a hollow interior, said body portion having a notch at one end adapted to detachably receive a terminal link of the tire chain and having an aperture at the other end adapted to receive the other terminal link, a plunger slidably carried within said body portion and adapted to slide across said notch, a spring normally holding the plunger across said notch, a rock shaft projecting from said body portion, and rack and pinion mechanism connecting said rock shaft with said plunger, said rock shaft having a transverse aperture therethrough for the reception of a pin.

2. A tire chain lock comprising a relatively flat member having a hollow interior and forming a body portion, said member having a notch at one end adapted to detachably receive a terminal link of a tire chain and having an aperture at the other end adapted to receive the other terminal link, a plunger slidably carried within the body portion and adapted to slide across said notch, and means for sliding said plunger across said notch, said plunger having a recess adapted to completely receive the first mentioned terminal link and said notch having a portion of its bottom closely adjacent said plunger when said plunger extends across said notch, whereby said first mentioned terminal link is held completely by said plunger.

In testimony that I claim the foregoing I have hereunto set my hand at Milwaukee, in the county of Milwaukee, and State of Wisconsin.

WILLIAM F. HELWIG.